United States Patent [19]

Brockmeyer

[11] Patent Number: 4,803,025

[45] Date of Patent: Feb. 7, 1989

[54] CERAMIC FOAM

[75] Inventor: Jerry W. Brockmeyer, Hendersonville, N.C.

[73] Assignee: Swiss Aluminium Ltd., Chippis, Switzerland

[21] Appl. No.: 602,683

[22] Filed: Apr. 23, 1984

[51] Int. Cl.[4] ................ G04B 35/00; G04B 35/10
[52] U.S. Cl. ................................. 264/63; 264/43; 264/59; 210/510.1
[58] Field of Search .............. 210/510.1; 55/523; 501/80, 119; 266/227, 229, 230, 231; 264/44, 43, 59, 63

[56] References Cited

U.S. PATENT DOCUMENTS

| | | | |
|---|---|---|---|
| 3,893,917 | 7/1975 | Pryor et al. | 210/501.1 |
| 3,947,363 | 3/1976 | Pryor et al. | 501/80 |
| 3,962,081 | 6/1976 | Yarwood et al. | 75/68 R |
| 4,069,057 | 1/1978 | Kamei et al. | 501/88 |
| 4,081,371 | 3/1978 | Yarwood et al. | 210/510.1 |
| 4,113,241 | 9/1978 | Dove | 210/510.1 |
| 4,257,810 | 3/1981 | Norumiya | 210/510.1 |
| 4,265,659 | 5/1981 | Blome | 210/510.1 |
| 4,307,198 | 12/1981 | Oda et al. | 55/523 |
| 4,343,704 | 8/1982 | Brockmeyer | 210/510.1 |

FOREIGN PATENT DOCUMENTS 2034298  6/1980  Japan ...................... 501/80

*Primary Examiner*—Kenneth Schor
*Attorney, Agent, or Firm*—Bachman & LaPointe

[57] ABSTRACT

Disclosed is a ceramic foam material and process for making same having superior strength and chemical durability properties wherein the impregnated foam impregnated with a phosphate bonded ceramic is fired at an elevated temperature so as to produce a ceramic body substantially free of phosphate and having individual grains of ceramic tightly coalesced to minimize porosity between the grains.

6 Claims, No Drawings

CERAMIC FOAM

BACKGROUND OF THE INVENTION

The present invention is drawn to an improved ceramic foam material and process for making same and, more particularly, a ceramic foam material having superior mechanical, thermal and chemical properties than ceramic foam materials heretofore known.

It is known in the art to employ porous ceramic foam materials to filter molten metal, especially aluminum, as described for example in U.S. Pat. Nos. 3,893,917, 3,947,363, 3,962,081, 4,024,056, 4,024,212, 4,075,303, 4,265,659, 4,342,644 and 4,343,704. The production material for these filters comprises primarily a phosphate bonded refractory material, having certain other additions, which has been fired to a temperature of about 2000° F. in order to mature the bond. See the process described in U.S. Pat. No. 3,962,081. While this type of refractory is suitable for use in the aluminum industry and easily withstands most aluminum alloys which are typically cast at about 1300° F., it is unsuitable for other potential applications due to its low strength and poor chemical durability. Naturally, it would be highly desirable to develop a material which maintains the favorable properties of the ceramic foam materials heretofore known, namely, high porosity, low pressure drop, high geometric surface area and tortuous flow path, but which overcomes the above-noted difficulties of strength and chemical durability. In addition, it would be desirable to develop a single material which could be relatively simply produced and used in a number of applications.

Accordingly, it is a principal object of the present invention to provide an improved ceramic foam material and process for making same.

It is an additional object of the present invention to provide an improved ceramic foam material characterized by superior strength and chemical properties.

It is a further object of the present invention to provide an improved ceramic foam material which is relatively simple to produce.

It is a still further object of the present invention to provide a ceramic foam material suitable for numerous diverse applications.

Further objects and advantages will appear hereinbelow.

SUMMARY OF THE INVENTION

In accordance with the present invention the foregoing objects and advantages are readily obtained.

The present invention provides an improved ceramic foam material and process for making same which is characterized by superior mechanical, thermal and chemical properties.

The improved ceramic foam filter of the present invention is prepared from a ceramic slurry containing at least 8% phosphate binder and is for use in filtering molten metal. The filter is characterized by having an open cell structure with a plurality of interconnected voids surrounded by a web of said ceramic. The filter is further characterized by being substantially phosphate free, i.e., having less than 2% of phosphate as $P_2O_5$, and having individual grains of ceramic tightly coalesced to minimize porosity between the grains, i.e., microporosity. The said microporosity is less than about 5%.

In accordance with the process of the present invention a hydrophobic, reticulated organic polymer foam, preferably polyurethane foam, is impregnated with an aqueous slurry of a thixotropic ceramic composition including a phosphate binder in an amount of at least 8% and preferably greater than 10%, dried and heated to remove the organic component therefrom, and fired at an elevated temperature to volatilize the phosphate producing a substantially phosphate-free material and sintering the refractory to produce a material having individual grains of ceramic tightly coalesced to minimize porosity between the grains. In the preferred embodiment the firing is at a temperature of about greater than or equal to 3020° F., and preferably about greater than or equal to 3050° F., so as to volatilize the phosphate and then sinter the refractory material. The resultant ceramic foam material is as indicated above substantially free of phosphate which is susceptible to chemical attack. In addition, the resultant material is characterized by an increase in strength properties and chemical durability. The preferred refractory material is alumina; however, other refractory material such as zirconia, silicon carbide or other materials suitable for use with a phosphate binder can be used. Naturally, specific temperatures will vary from system to system.

DETAILED DESCRIPTION

In accordance with the present invention the ceramic foam is prepared from an open cell, preferably hydrophobic flexible foam material having a plurality of interconnected voids surrounded by a web of said flexible foam material. Typical material which may be used include the polymeric foams such as polyurethane foams, and the cellulosic foams. Generally, any combustible organic plastic foam may be used which has resilience and ability to recover its original shape. The foam must burn out or volatilize at below the firing temperature of the ceramic material which is employed.

The aqueous ceramic slurry which is employed should be thixotropic, have a relatively high degree of fluidity and be comprised of an aqueous suspension of the ceramic intended for use in the material. Typical ceramic materials which may be employed include alumina, zirconia and silicon carbide or mixtures of ceramics. While alumina is preferred as the refractory material, any refractory material suitable for use with a phosphate binder and having a sintering temperature greater than the phosphorus volatilization temperature can be used. While aluminum orthophosphate is the preferred binder, naturally others can be used if desired, such as for example, phosphoric acid, aluminum phosphate, alkali metal phosphates as sodium hexametaphosphate, etc. The slurry should contain at least 8% and preferably greater than 10% phosphate binder by weight of solids.

Detailed procedures for preparing ceramic foams for molten metal filters are described in U.S. Pat. Nos. 3,962,081, 4,075,303 and 4,024,212, the disclosures of which are hereby incorporated by reference.

The flexible foam material is impregnated with the aqueous ceramic slurry so that the fiber-like webs are coated therewith and the voids are filled therewith. Normally, it is preferred to simply immerse the foam in the slurry for a short period of time sufficient to insure complete impregnation of the foam.

The impregnated foam is then compressed to expel a portion of the slurry while leaving the fiber-like web portion coated therewith and with a plurality of blocked pores throughout the body to increase flow path tortuosity, i.e., homogeneously distributed throughout the ceramic body rather than grouped together. In a continuous operation one may pass the impregnated foam through a preset roller to effect the desired expulsion of slurry from the foam and leave the desired amount impregnated therein. Naturally, this may be done manually by simply squeezing the flexible foam material to the desired extent. At this stage the foam is still flexible and may if desired be formed into configurations suitable for specific filtration tasks, i.e, into curved plates, hollow cylinders, etc. It is necessary to hold the formed foam in position by conventional means until the organic substrate is decomposed, or preferably until the ceramic is sintered. The impregnated foam is then dried by any suitable means, such as air drying, accelerated drying at a temperature of from 100° to 700° C. for from 15 minutes to 6 hours, or by microwave drying. Air drying may be achieved in from 8 to 24 hours. After drying, the material is heated at an elevated temperature to sinter the ceramic coating on the fiber-like webs leaving the plurality of blocked pores as described above.

In accordance with the present invention, the dried impregnated material is heated to an elevated temperature to sinter the refractory and volatilize the phosphate to produce a substantially phosphate-free material having individual grains tightly coalesced to minimize porosity between the grains, i.e., with a mircoporosity less than about 5%. Preferably the firing is at a temperature of at least 3020° F., preferably at least 3050° F. and held at that temperature for from 15 minutes to 10 hours in order to volatilize the web of flexible foam, volatilize the phosphate and sinter the ceramic.

The resultant product is a porous, fused ceramic foam material which is substantially free of phosphate, i.e., has less than 2% of phosphate as $P_2O_5$, and is characterized by superior mechanical, thermal and chemical properties than ceramic foam materials heretofore known. The ceramic foam is characterized by having an open cell structure with a plurality of interconnected voids surrounded by a web of ceramic. The foam has individual grains of ceramic tightly coalesced to minimize porosity between the grains, i.e., microporosity. The said microporosity is less than about 5%.

The aforesaid structure results in increasing desirable physical properties, such as increased mechanical, thermal and chemical properties. In addition, the aforesaid processing results in the entire structure shrinking somewhat and thereby resulting in a reduction of the macroporosity or gross porosity of the entire filter, for example, a filter processed in accordance with the present invention will have its macroporosity reduced from about 90% without the present processing to 85% with the present processing.

In accordance with the present invention, the specific features thereof will be more readily understandable from a consideration of the following comparative data.

Samples were prepared by impregnating a hydrophobic, reticulated polyurethane foam material with a ceramic slurry containing as solids 98% alumina and 2% montmorillonite as a rheological aid. About 30% aluminum orthophosphate binder in a 50% aqueous solution based on total weight was added. The samples were dried and fired at temperatures of 2000° F., 2870° F., 2980° F., 3020° F., 3050° F., and 3090° F. for 5 hours. The samples were then subject to a chemical analysis, compressive strength tests and chemical resistance tests. The results are set forth hereinbelow.

The results clearly showed that samples fired at around 2000° F. contained substantially in excess of 2% phosphate as $P_2O_5$, but samples fired at 3020° F. and above were substantially phosphate-free, i.e., contained less than 2% phosphate as $P_2O_5$. In addition, in all cases the samples fired at 3020° F. and above were characterized by having individual grains of ceramic tightly coalesced to minimize porosity between the grains wherein the said microporosity was less than 5%.

Tables I and II below show various properties at the various firing temperatures.

TABLE I

COMPRESSIVE STRENGTH, BULK DENSITY AND THICKNESS OF CERAMIC FOAMS FIRED AT VARIOUS TEMPERATURES

| FIRING °F. | NO. SAMPLES TESTED | COMPRESSIVE STRENGTH kg/cm² | psi | APPARENT BULK DENSITY gm/cm³ | lb/ft³ | THICKNESS cm | in. |
|---|---|---|---|---|---|---|---|
| 2000 | 8 | 10.28 | 146 | 0.31 | 19.2 | 5.10 | 2.01 |
| 2870 | 10 | 11.01 | 157 | 0.36 | 22.3 | 4.87 | 1.92 |
| 2980 | 9 | 9.70 | 138 | 0.33 | 20.4 | 4.82 | 1.90 |
| 3020 | 11 | 10.12 | 144 | 0.37 | 22.9 | 4.64 | 1.83 |
| 3050 | 10 | 14.30 | 203 | 0.37 | 22.9 | 4.41 | 1.74 |
| 3090 | 10 | 18.52 | 263 | 0.39 | 24.1 | 4.48 | 1.77 |

The strength data shown in Table I, above, show a strong increase at temperatures above 3050° F. while acceptable strength is obtained at 3020° F. The data also show that the apparent density increases and the thickness decreases indicating shrinkage which in turn is related to the loss of porosity in the walls, i.e., microporosity.

TABLE II

CHEMICAL RESISTANCE OF CERAMIC FOAMS FIRED AT VARIOUS TEMPERATURES

| FIRING TEMP. °F. | WEIGHT LOSS (%) in: | | | | |
|---|---|---|---|---|---|
| | 10% NaOH | 10% HNO₃ | 10% H₂SO₄ | 10% HCl | 10% CH₃COOH |
| 2000 | SAMPLES DISINTEGRATED IN THE SOLUTIONS | | | | |
| 2870 | 13.4 | 12.5 | 12.6 | 10.5 | 1.5 |
| 2980 | 10.4 | 10.5 | 10.6 | 10.6 | 1.4 |
| 3020 | 8.8 | 10.1 | 8.1 | 9.2 | 1.6 |
| 3050 | 3.6 | 4.9 | 4.4 | 5.5 | 1.1 |

TABLE II-continued

| FIRING TEMP. °F. | CHEMICAL RESISTANCE OF CERAMIC FOAMS FIRED AT VARIOUS TEMPERATURES WEIGHT LOSS (%) in: | | | | |
|---|---|---|---|---|---|
| | 10% NaOH | 10% HNO$_3$ | 10% H$_2$SO$_4$ | 10% HCl | 10% CH$_3$COOH |
| 3090 | 2.7 | 2.0 | 2.2 | 1.4 | 0.9 |

Chemical resistance of the ceramic was determined by immersing the pre-weighed filter samples in the specified solutions for 5½ days. The samples were then removed from the solutions, rinsed, dried and re-weighed. The 2000° F. samples disintegrated or softened to the point that they could not be removed from the solutions intact, so no weight loss data was recorded. Weight losses for the other samples are as shown. There appears to be a dramatic change at 3020° F. and even more so at 3050° F.

Thus, as can be seen from the foregoing, a ceramic foam material having superior strength properties and chemical durability is obtained.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for preparing a ceramic foam filter for filtering molten metal which comprises:

providing a reticulated, organic polymer foam; impregnating said foam with an aqueous slurry of a thixotropic ceramic composition including a phosphate binder in an amount of at least 8%; drying and heating said impregnated polymer foam to remove the organic component therefrom; and firing at an elevated temperature of at least about 3020° F. to volatilize the phosphate producing a substantially phosphate-free material and sintering the refractory to produce a material having individual grains of ceramic tightly coalesced to minimize porosity between the grains, wherein the porosity between the grains is microporosity and the microporosity is less than about 5%.

2. A process according to claim 1 wherein the polymer foam is a polyurethane foam.

3. A process according to claim 1 wherein the firing temperature is greater than or equal to 3020° F. for from 15 minutes to 10 hours.

4. A process according to claim 3 wherein the firing temperature is greater than or equal to 3050° F. for from 15 minutes to 10 hours.

5. A process according to claim 1 wherein said ceramic is alumina.

6. A process according to claim 1 wherein said phosphate is aluminum orthophosphate.

* * * * *